(12) United States Patent
Gentleman et al.

(10) Patent No.: US 7,562,462 B2
(45) Date of Patent: Jul. 21, 2009

(54) HANDS-FREE LEVEL INDICATING DEVICE

(76) Inventors: Carl Gentleman, 402 4th St., Box 53, Silver Creek, NE (US) 68663; Robert E. Hinze, P.O. Box 135, Columbus, NE (US) 68634; Daryl L. Tschantre, Box 207, Silver Creek, NE (US) 68663

( * ) Notice: Subject to any disclaimer, the term of this patent is extended or adjusted under 35 U.S.C. 154(b) by 34 days.

(21) Appl. No.: 12/025,144

(22) Filed: Feb. 4, 2008

(65) Prior Publication Data
US 2008/0235967 A1 Oct. 2, 2008

Related U.S. Application Data

(60) Provisional application No. 60/874,367, filed on Mar. 28, 2007.

(51) Int. Cl.
*G01C 9/26* (2006.01)
(52) U.S. Cl. .............. 33/372; 33/347; 24/555; 24/563
(58) Field of Classification Search ........... 33/370–373, 33/347, 354; 24/545, 555, 563, 335, 336, 24/457; 248/218.4, 219.4, 230.7
See application file for complete search history.

(56) References Cited

U.S. PATENT DOCUMENTS

| | | | |
|---|---|---|---|
| 527,815 A | 10/1894 | Schnell | |
| 797,214 A * | 8/1905 | O'Haire | 24/563 |
| 2,092,681 A * | 9/1937 | Reilly | 24/563 |
| 2,531,563 A | 11/1950 | Feldheim | |
| 4,663,856 A | 5/1987 | Hall et al. | |
| 4,829,676 A | 5/1989 | Waldron | |
| 5,408,752 A | 4/1995 | Eadens | |
| 5,581,900 A * | 12/1996 | Payne | 33/370 |
| 5,815,937 A | 10/1998 | Glorioso, Jr. | |
| 5,819,425 A | 10/1998 | Payne | |
| 6,029,359 A | 2/2000 | Szumer | |
| 6,131,298 A | 10/2000 | McKinney et al. | |
| 6,332,277 B1 | 12/2001 | Owoc et al. | |
| 7,059,059 B1 * | 6/2006 | Ames | 33/372 |
| 7,131,170 B2 * | 11/2006 | Weaver | 24/545 |
| 2007/0245580 A1 * | 10/2007 | Jelinek | 33/372 |

* cited by examiner

*Primary Examiner*—G. Bradley Bennett
(74) *Attorney, Agent, or Firm*—Jeffrey L. Thompson; Thompson & Thompson, P.A.

(57) ABSTRACT

A hands-free level indicating device includes a level for determining a spatial orientation of a structural member, and an apparatus for securing the level to the structural member. The apparatus includes a U-shaped portion for attaching to the level and a hook-shaped portion for clamping around the structural member. The U-shaped portion and hook-shaped portion can be formed from a single strip of flat material, such as spring steel. A spring is provided to bias the hook-shaped portion in a direction toward the level to allow the apparatus to secure the level to different sizes of structural members. The spring can be a leaf spring that attaches to a base of the U-shaped portion and extends in a longitudinal direction of the level.

20 Claims, 3 Drawing Sheets

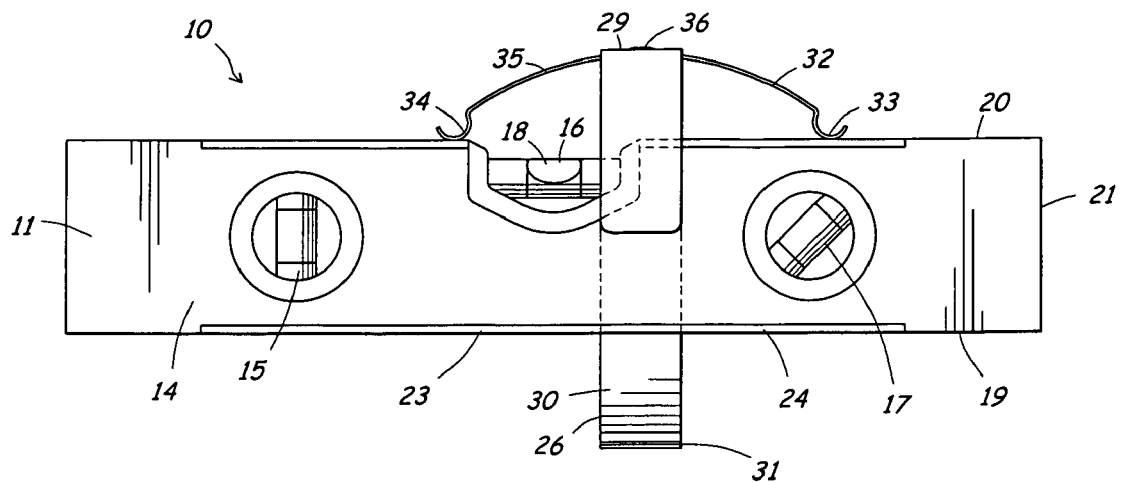
Fig. 4
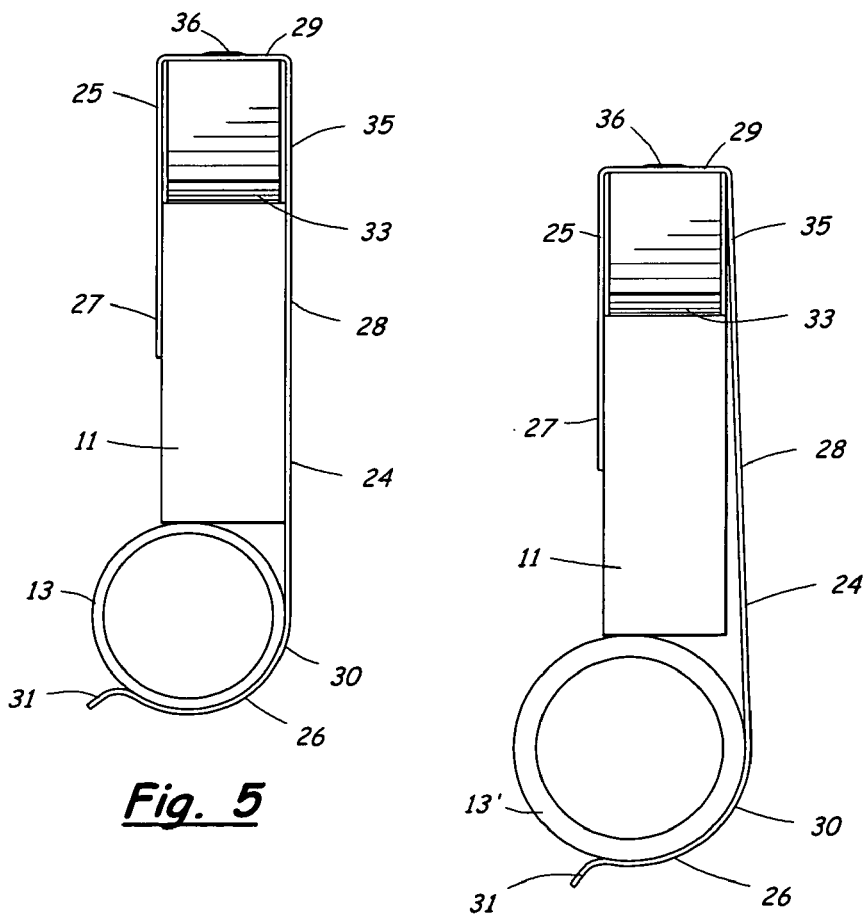
Fig. 5
Fig. 6

HANDS-FREE LEVEL INDICATING DEVICE

RELATED APPLICATIONS

This application claims priority of U.S. Provisional Application No. 60/874,367 filed on Mar. 28, 2007. The entire content of this prior application is hereby incorporated by reference.

BACKGROUND OF THE INVENTION

1. Field of the Invention

This invention relates generally to levels and, in particular, to an apparatus for securing a level to a structural member for hands-free use of the level.

2. Description of the Related Art

Carpenters, plumbers, electricians, and other craftsmen work with structural members, such as pipes, rods and beams in the construction industry. Typical construction operations include fixing structural members in a predetermined spatial orientation, such as horizontal, vertical, or pitched. A level is used to align the structural members in the desired horizontal, vertical, or pitched spatial orientation.

A conventional level includes a working surface along one side edge, and a body containing one or more transparent tubes filled with a liquid. The transparent tubes are disposed in horizontal, vertical or pitched planes relative to the working surface of the level. The desired orientation of the structural member is achieved by centering a bubble within a reference field of the tube. The bubble provides a visual indication of the spatial orientation of the structural member while the structural member is being permanently fixed in such orientation.

When using a level, a craftsman often must maintain the level flush against the structural member while the structural member is being aligned and until the structural member is permanently fixed in position. This is generally accomplished by manually holding the level against the structural member while permanently fixing the structural member in position. However, a single person operation is not always feasible due to the awkward handling characteristics of the structural member to be positioned. In such cases, a two person team may be required to accomplish the task.

Various devices have been used to maintain a level flush with a structural member without manually holding the level. For example, levels are commonly made with a strip of magnet material along the working surface of the level for magnetic attachment to metallic structural members, such as steel pipe. However, the magnets are not useful for attaching to non-magnetic materials, such as PVC, CPVC, aluminum, magnesium, wood, and the like.

U.S. Pat. No. 4,829,676 of Waldron discloses a hands-free level indicating device in which a pair of detachable securing clips are used to secure a level to a structural member. In Waldron's device, the level is specially made with slots at each end for receiving the detachable clips.

U.S. Pat. No. 6,131,298 of McKinney et al. discloses a self-supporting level device in which spring biased clamps are secured at each end of the level for attaching the level to a structural member.

U.S. Pat. No. 6,332,277 of Owoc et al. discloses a level with a securing apparatus for attaching to a structural member. The securing apparatus is in the form of articulated arms or flexible bands connected to the frame of the level.

There exists a need in the construction industry for an improved, hands-free level holder that can be attached to and used to hold conventional levels to non-magnetic structural members.

SUMMARY OF THE INVENTION

An object of the present invention is to provide an improved apparatus for attaching a conventional level to non-magnetic structural members.

More specifically, an object of the present invention is to provide an apparatus that can be quickly and removably attached to a conventional level, that has a hook-shaped portion for attaching to non-magnetic structural members, that can be used with different sizes of structural members, and that is economical to manufacture and capable of a long operating life.

To achieve these and other objects of the invention, a hands-free level indicating device is provided that includes a level for determining a spatial orientation of a structural member, and an apparatus for securing the level to the structural member. The apparatus includes a U-shaped portion for attaching to the level and a hook-shaped portion for clamping around the structural member. The U-shaped portion and hook-shaped portion can be formed from a single strip of flat material, such as spring steel. A spring is provided to bias the hook-shaped portion in a direction toward the level to allow the apparatus to secure the level to different sizes of structural members. The spring can be a leaf spring that attaches to a base of the U-shaped portion and extends in a longitudinal direction of the level.

According to one aspect of the present invention, an apparatus is provided for securing a level to a pipe, comprising: a first portion for attaching to a level; a second portion extending from the first portion and having a hook-shaped end for fitting at least part way around a pipe; and a spring arranged to bias the hook-shaped end in a direction toward the level to which the first portion is attached, whereby the spring allows the apparatus to secure the level to different sized pipes.

According to another aspect of the present invention, a hands-free level indicating device is provided, comprising: a level means for determining a spatial orientation of a structural member, the level means having a first working surface adapted to engage the structural member and a level body containing a liquid filled tube for providing a visual indication of the spatial orientation; and an apparatus for securing the level means to a structural member. The apparatus comprises: a strap having a U-shaped portion formed at one end attached to the level body and a hook-shaped portion formed at another end for fitting around the structural member, the U-shaped and hook-shaped portions being arranged to secure the level means to the structural member with the working surface of the level means engaged with a surface of the structural member; and a spring arranged to bias the hook-shaped portion in a direction toward the working surface of the level to allow the apparatus to secure the level means to different sizes of structural members.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 4 is an elevation view of the hands-free level indicating device according to the present invention.

FIG. 5 is an end view of the hands-free level indicating device attached to a relatively small diameter pipe.

FIG. 6 is another end view of the hands-free level indicating device attached to a relatively large diameter pipe.

DETAILED DESCRIPTION OF THE INVENTION

Figure 1:
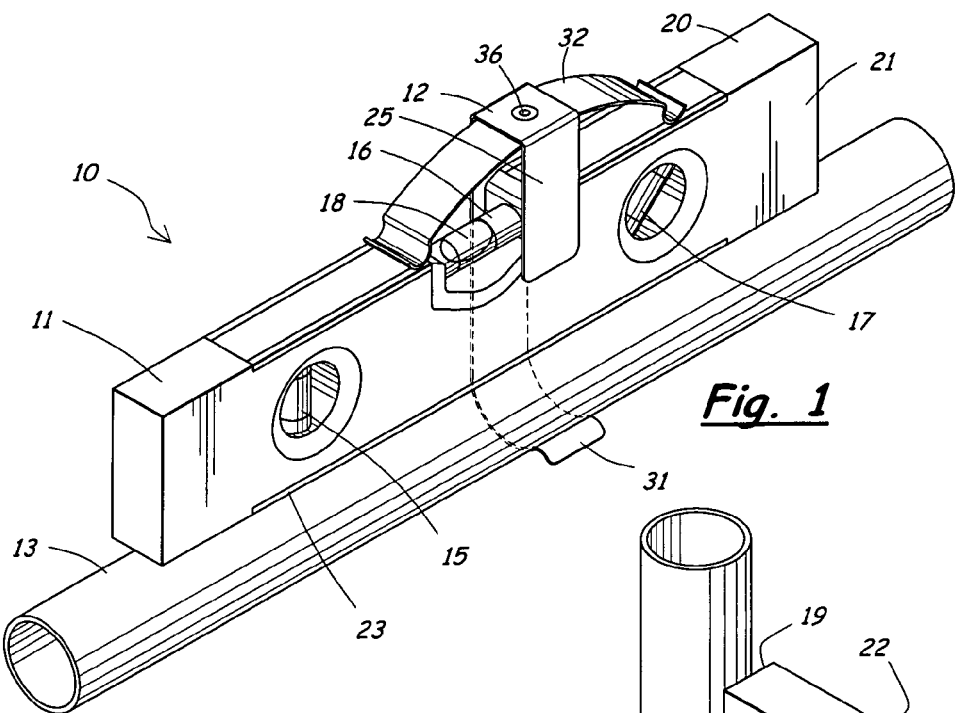
FIG. 1 is a perspective view of a hands-free level indicating device according to the present invention attached to a horizontal pipe.
Figure 3:
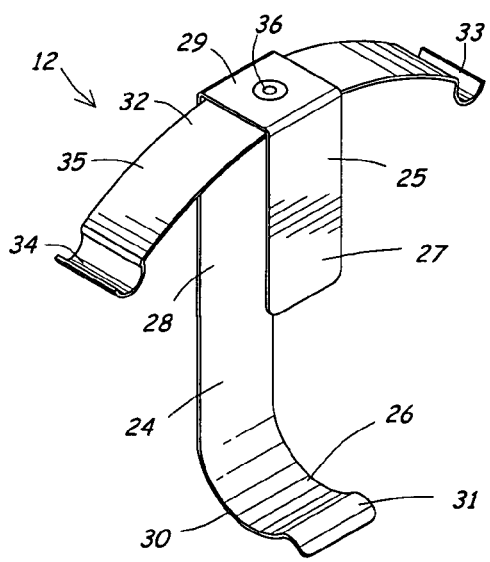
FIG. 3 is a perspective view of the apparatus for securing a level to a pipe according to the present invention.
Figure 2:
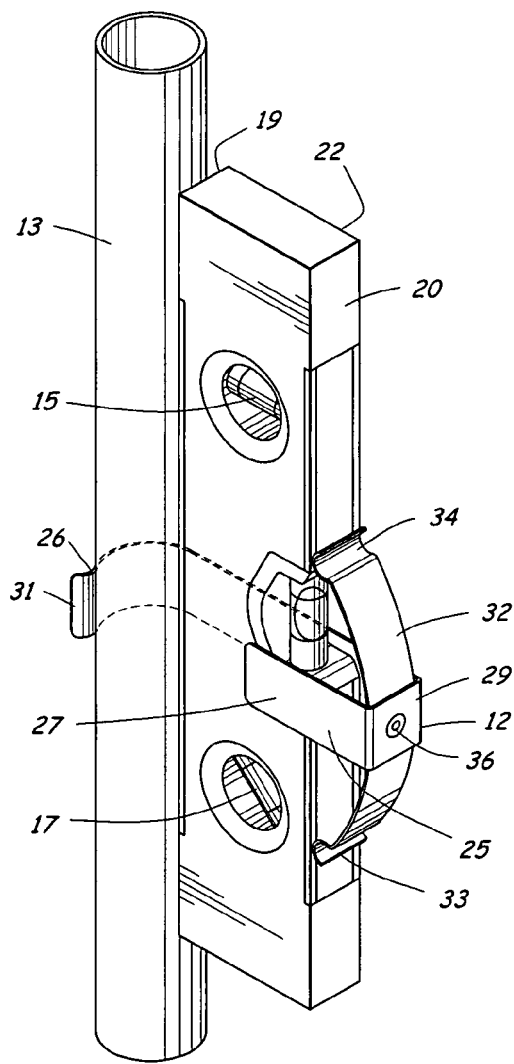
FIG. 2 is a perspective view of the hands-free level indicating device of the present invention attached to a vertical pipe.
Figure 7:
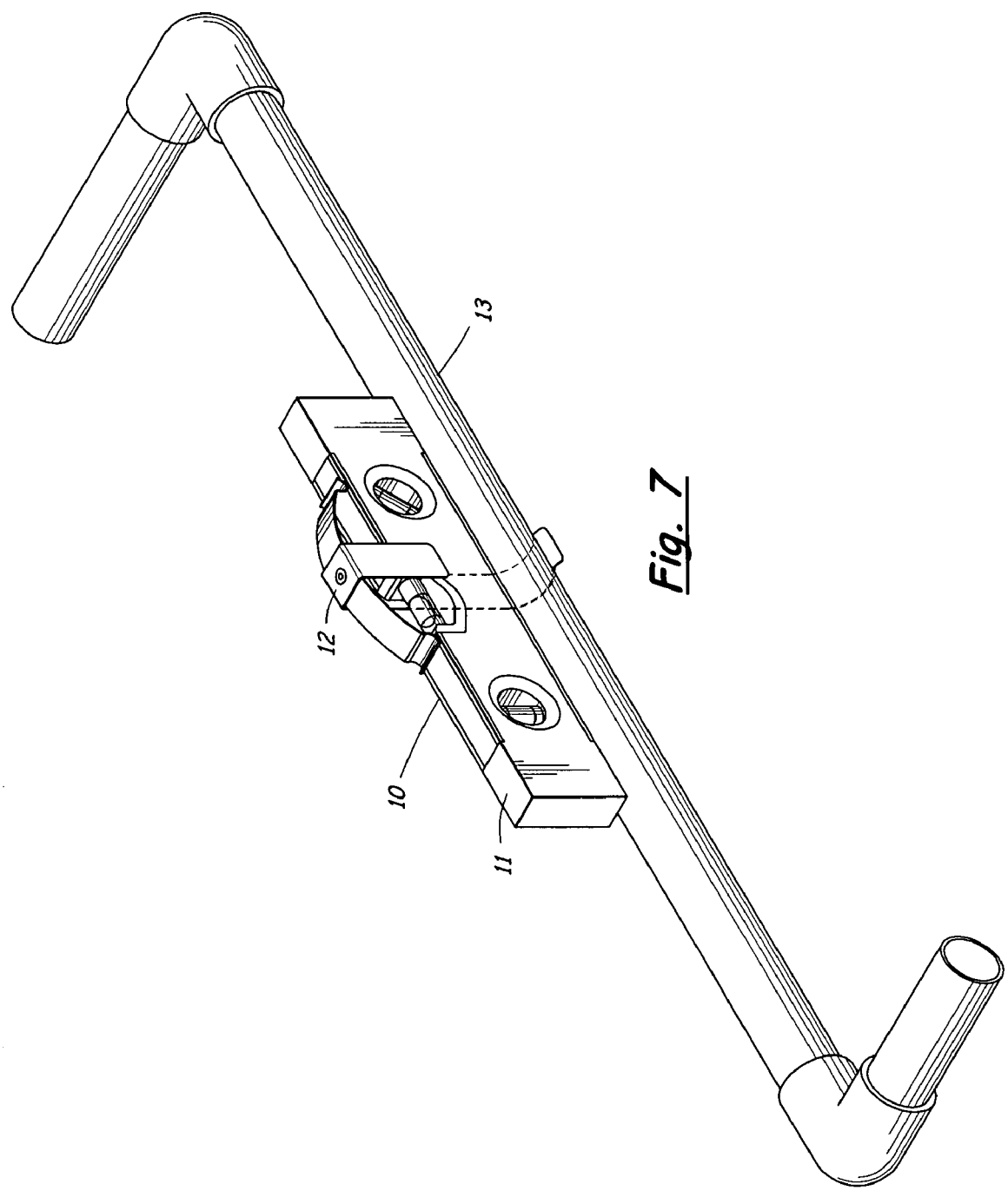
FIG. 7 is another perspective view of the hands-free level indicating device attached to a structural pipe member.

A hands-free level indicating device 10 according to the present invention will now be described in detail with reference to FIGS. 1 to 7 of the accompanying drawings.

The hands-free level indicating device 10 of the present invention comprises a level 11 and an apparatus 12 for securing the level 11 to a structural member 13. The level 11 can be, for example, a conventional level used by carpenters, electricians, plumbers and other craftsman. The level 11 includes a body 14 having one or more liquid-filled tubes 15-17 inset therein. An air bubble 18 in each tube provides a visual indication of the spatial orientation of the tube 15.

The level shown in FIG. 1 has three liquid-filled tubes 15-17 mounted thereon at various orientations, including a first tube 15 extending in a transverse direction, a second tube 16 extending in a longitudinal direction, and a third tube 17 extending at a 45 degree angle. The tubes 15-17 of the level 11 are arranged in different directions so that the level 11 can be used to spatially orientate a variety of structural members 13 requiring differing spatial orientations.

The level 11 also includes a working surface 19 along one side edge, a second side edge 20 opposite from the working surface 19, a front side 21, and a back side 22. The working surface 19 of the level 11 is adapted to engage a structural member 13, such as a pipe. The working surface 19 is that segment of the level 11 that is maintained flush with a surface of the structural member 13 during use to determine the spatial orientation of the structural member 13.

Conventional levels 11 are often provided with one or more magnets 23 along the working surface 19 to secure the level 11 to structural members 13 made of magnetic material, such as iron pipes. However, such magnets 23 are not useful for securing the level 11 to non-magnetic materials, such as PVC, CPVC, magnesium, aluminum, or other non-magnetic structural members.

The apparatus 12 for securing the level 11 to a structural member 13 according to the present invention does not require magnets. Instead, the apparatus 12 uses a clamping action provided by a strap 24 that has a first portion 25 attached to the level body 14 and a second portion 26 having a hook-shaped end for resiliently clamping around the structural member 13. When installed, the apparatus 12 wraps around the level 11 and the structural member 13 and squeezes them together to secure the level 11 to the structural member 13 with the working surface 19 pressed against a surface of the structural member 13.

The first portion 25 of the apparatus 12 includes a U-shaped bend in the strap 24 that defines first and second opposed leg segments 27, 28 and a base 29 connected between the first and second leg segments 27, 28. The opposed leg segments 27, 28 are arranged to engage the front and back sides 21, 22 of the level 11 to sandwich the level body 14 therebetween with enough force to maintain the apparatus 12 coupled with the level body 14 when desired, while allowing the apparatus 12 to be easily removed from the level body 14.

The second portion 26 of the apparatus 12 includes a hook-shaped bend 30 in the strap 24 for fitting around the structural member 13. The hook-shaped bend 30 is preferably long enough to extend to an opposite side of the structural member 13 relative to the working surface 19 of the level 11. As shown in FIGS. 5 and 6, the hook-shaped bend 30 extends further around a smaller sized structural member 13 (FIG. 5) than it extends around a larger sized structural member 13' (FIG. 6). However, in both cases, the distal end 31 of the hook-shaped bend 30 extends at least far enough around the structural member 13, 13' to hold the working surface 19 of the level 11 against the structural member 13, 13'.

The apparatus 12 also includes a spring 32 arranged to bias the hook-shaped second portion 26 in a direction toward the working surface 19 of the level 11. In the illustrated embodiment, the spring 32 is arranged to apply a spring force between the base 29 of the U-shaped portion 25 and the second side edge 20 of the level 11. The spring 32 comprises a leaf spring having first and second ends 33, 34 and a spring body 35 extending between the ends 33, 34. The spring body 35 is connected to the base 29 so that the leaf spring 32 extends in a longitudinal direction of the level 11 perpendicular to the strap 24. The spring body 35 and base 29 can be connected, for example, using a rivet 36, a spot weld, or other conventional fastening technique.

The leaf spring 32 has a predefined curvature in the spring body 35 between its ends 33, 34, which tends to hold the base 29 of the U-shaped portion 25 away from the second side edge 20 of the level 11. However, upon installing the hook-shaped portion 26 of the apparatus 12 over a structural member 13, the strap 24 is pulled in a direction that moves the base 29 of the U-shaped portion 25 toward the level 11. The leaf spring 32 flexes in an amount necessary to allow the hook-shaped portion 26 to fit over various sizes of structural members 13, 13' without permanently deforming either the strap 24 or the spring 32 of the apparatus, while still providing a secure fit over the structural members 13, 13'.

The leaf spring 32 and strap 24 of the apparatus 12 can be formed, for example, of spring steel, nylon, or other types of plastic or polymers that allow for spring tension to hold the level 11 securely to the structural member 13. In one embodiment, the leaf spring 32 and strap 24 are both formed of spring steel and are connected together by a rivet 36.

The ends 33, 34 of the leaf spring 32 are rounded to facilitate sliding movement along the surface of the second side edge 20 of the level body 14 when the leaf spring 32 flexes. The ends 33, 34 can be rounded, for example, by creating a bend at each end, as shown.

The hook-shaped portion 26 has an oppositely curved distal tip 31 to facilitate sliding movement over a surface of a structural member 13, such as a pipe. The curved distal tip 31 can be curved, for example, by creating a short bend in a direction opposite the larger bend used to form the hook-shape 30, as shown.

In use, the apparatus 12 is first attached to a level 11 by placing the level 11 between the two opposed leg segments 27, 28 with the working surface 19 of the level 11 facing toward the hook-shaped portion 26, as shown in FIG. 4. The apparatus 12 with the level 11 attached is then placed over a structural member 13, such as a pipe, by forcing the structural member 13 between the gap defined by the distal tip 31 of the hook-shaped portion 26 and the working surface 19 of the level 11. Once the structural member 13 is located between the hook-shaped portion 26 and the working surface 19 of the level 11, the level 11 is held securely to the structural member 13 by the apparatus 12 and can be used in a hands-free manner.

While the invention has been specifically described in connection with specific embodiments thereof, it is to be understood that this is by way of illustration and not of limitation, and the scope of the appended claims should be construed as broadly as the prior art will permit.

What is claimed is:

1. An apparatus for securing a level to a pipe, comprising:
   a first portion for attaching to a level;
   a second portion extending from the first portion and having a hook-shaped end for fitting at least part way around a pipe; and
   a spring arranged to bias the hook-shaped end in a direction toward the level to which the first portion is attached, whereby the spring allows the apparatus to secure the level to different sized pipes.

2. The apparatus according to claim 1, wherein said first and second portions are formed of a single piece of strap material having a U-shape at a first end and a hook shape at a second end, said first end providing said first portion for attaching to a level, and said second end providing said second portion for fitting around a pipe.

3. The apparatus according to claim 2, wherein said U-shaped first end has first and second opposed leg segments arranged to sandwich a level therebetween, and a base extending between the first and second legs segments.

4. The apparatus according to claim 3, wherein said spring is arranged to apply a spring force between said base and a level.

5. The apparatus according to claim 3, wherein said spring comprises a leaf spring having first and second ends and spring body extending between the ends, and wherein said spring body is connected to said base so that the leaf spring extends in a longitudinal direction of a level secured by the apparatus.

6. The apparatus according to claim 5, wherein said leaf spring ends are rounded to facilitate sliding movement along a surface of a level when the leaf spring flexes.

7. The apparatus according to claim 2, wherein said hook-shaped second end has an oppositely curved distal tip to facilitate sliding movement over a surface of a pipe.

8. An apparatus for securing a level to a pipe, comprising:
   a strap having a U-shaped portion formed at one end for attaching to a level and a hook-shaped portion formed at another end for fitting around a pipe, said U-shaped and hook-shaped portions being arranged to attach to a level and fit around a pipe for securing the level to the pipe; and
   a spring arranged to bias the hook-shaped portion in a direction toward the level to allow the apparatus to secure the level to different sizes of pipes.

9. The apparatus according to claim 8, wherein said U-shaped portion has first and second opposed leg segments arranged to sandwich a level therebetween, and a base connected between the first and second leg segments.

10. The apparatus according to claim 9, wherein said spring is arranged to apply a spring force between said base and a level.

11. The apparatus according to claim 10, wherein said spring comprises a leaf spring having first and second ends and a spring body extending between the ends, and wherein said spring body is connected to said base so that the leaf spring extends in a longitudinal direction of a level secured by the apparatus.

12. The apparatus according to claim 11, wherein said leaf spring ends are rounded to facilitate sliding movement along a surface of a level when the leaf spring flexes.

13. The apparatus according to claim 8, wherein said hook-shaped portion has an oppositely curved distal tip to facilitate sliding movement over a surface of a pipe.

14. A hands-free level indicating device, comprising:
    a level means for determining a spatial orientation of a structural member, said level means having a first working surface adapted to engage the structural member and a level body containing a liquid-filled tube for providing a visual indication of the spatial orientation; and
    an apparatus for securing the level means to a structural member, said apparatus comprising:
    a strap having a U-shaped portion formed at one end attached to the level body and a hook-shaped portion formed at another end for fitting around the structural member, said U-shaped and hook-shaped portions being arranged to secure the level means to the structural member with the working surface of the level means engaged with a surface of the structural member; and
    a spring arranged to bias the hook-shaped portion in a direction toward the working surface of the level to allow the apparatus to secure the level means to different sizes of structural members.

15. The hands-free level indicating device according to claim 14, wherein said U-shaped portion has first and second opposed leg segments arranged to sandwich the level body therebetween, and a base connected between the first and second leg segments.

16. The hands-free level indicating device according to claim 15, wherein said spring is arranged to apply a spring force between said base and said level body.

17. The hands-free level indicating device according to claim 16, wherein said spring comprises a leaf spring having first and second ends and a spring body extending between the ends, and wherein said spring body is connected to said base so that the leaf spring extends in a longitudinal direction of the level body.

18. The hands-free level indicating device according to claim 17, wherein said leaf spring ends are rounded to facilitate sliding movement along a surface of the level body when the leaf spring flexes.

19. The hands-free level indicating device according to claim 14, wherein said hook-shaped portion has an oppositely curved distal tip to facilitate sliding movement over a surface of a structural member.

20. The hands-free level indicating device according to claim 14, wherein said strap and said spring are both formed of spring steel.

* * * * *